(12) United States Patent
Childress et al.

(10) Patent No.: US 7,769,807 B2
(45) Date of Patent: Aug. 3, 2010

(54) POLICY BASED AUDITING OF WORKFLOWS

(75) Inventors: Rhonda L. Childress, Austin, TX (US); Edmond Chow, Austin, TX (US); David Bruce Kumhyr, Austin, TX (US); Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/176,101

(22) Filed: Jul. 18, 2008

(65) Prior Publication Data

US 2009/0019123 A1 Jan. 15, 2009

Related U.S. Application Data

(63) Continuation of application No. 11/109,087, filed on Apr. 19, 2005.

(51) Int. Cl.
*G06F 15/16* (2006.01)

(52) U.S. Cl. .................. 709/203; 709/206; 709/223; 709/224; 700/103; 700/109; 705/1; 705/7; 717/100; 717/124

(58) Field of Classification Search .............. 709/203, 709/223, 224, 206; 705/1, 7; 717/100, 124; 700/103, 109
See application file for complete search history.

(56) References Cited

U.S. PATENT DOCUMENTS 5,627,764 A * 5/1997 Schutzman et al. ......... 709/207
5,768,506 A * 6/1998 Randell ...................... 709/202
5,774,661 A * 6/1998 Chatterjee et al. ........... 709/203
6,029,144 A * 2/2000 Barrett et al. ................ 705/30
6,073,242 A   6/2000 Hardy et al. ................ 713/201
6,279,009 B1 * 8/2001 Smirnov et al. ................ 1/1
6,347,374 B1 * 2/2002 Drake et al. .................. 726/1
6,438,468 B1 * 8/2002 Muxlow et al. ................ 701/3

(Continued)

OTHER PUBLICATIONS

Kim et al.; On-line integrity monitoring of microprocessor control logic; Aug. 2001; Microelectronics Journal 32; pp. 999-1007.*

(Continued)

*Primary Examiner*—Rupal D Dharia
*Assistant Examiner*—Jimmy H Tran
(74) *Attorney, Agent, or Firm*—Yee & Associates, P.C.; William H. Steinberg; Rudolf O. Siegesmund

(57) ABSTRACT

An auditing system is disclosed comprising a Policy Validation Mechanism Program (PVMP) that operates in conjunction with a Workflow Engine (WE), and a Policy Validation Server Program (PVSP) that operates on a Policy Validation Server (PVS) connected to the WE by a secure communication link. The PVMP converts a workflow to a workflow representation (WR) and sends the WR to the PVS. The PVSP compares the steps in the WR to a security policy identified for that WR and determines whether the WR is in compliance. In addition, the PVSP validates a checksum for the WR and logs the checksum for subsequent comparisons. The PVSP uses the checksum to determine whether a policy has changed during execution of the workflow. If the WR is not in compliance, if the checksum cannot be validated, or if a policy has changed, then a failure notification is sent to the WE. Otherwise, a success notification is sent to the WR.

13 Claims, 3 Drawing Sheets

U.S. PATENT DOCUMENTS

| | | |
|---|---|---|
| 6,456,955 B1 | 9/2002 | Andrews et al. |
| 6,484,261 B1 | 11/2002 | Wiegel |
| 6,499,023 B1 * | 12/2002 | Dong et al. .................... 706/46 |
| 6,546,364 B1 * | 4/2003 | Smirnov et al. ............... 703/22 |
| 6,658,568 B1 | 12/2003 | Ginter et al. ................ 713/193 |
| 6,769,118 B2 * | 7/2004 | Garrison et al. ............. 717/177 |
| 6,845,503 B1 * | 1/2005 | Carlson et al. .............. 717/166 |
| 6,862,488 B2 | 3/2005 | Mansour-Awad |
| 6,874,008 B1 * | 3/2005 | Eason et al. ................ 709/201 |
| 6,874,025 B2 * | 3/2005 | Hoogenboom et al. ...... 709/225 |
| 6,986,043 B2 | 1/2006 | Andrew et al. |
| 7,114,152 B2 * | 9/2006 | Hogstrom et al. ........... 717/166 |
| 7,386,529 B2 * | 6/2008 | Kiessig et al. ..................... 1/1 |
| 7,451,167 B2 | 11/2008 | Bali et al. |
| 2002/0019935 A1 | 2/2002 | Andrew et al. |
| 2002/0078432 A1 * | 6/2002 | Charisius et al. ............ 717/102 |
| 2002/0091939 A1 | 7/2002 | Garrison et al. |
| 2002/0116399 A1 * | 8/2002 | Camps et al. ............... 707/200 |
| 2002/0156879 A1 * | 10/2002 | Delany et al. ............... 709/223 |
| 2003/0005406 A1 * | 1/2003 | Lin et al. .................... 717/102 |
| 2003/0055668 A1 * | 3/2003 | Saran et al. ..................... 705/1 |
| 2003/0061506 A1 | 3/2003 | Cooper et al. |
| 2003/0069894 A1 | 4/2003 | Cotter et al. |
| 2003/0172302 A1 * | 9/2003 | Judge et al. .................. 713/201 |
| 2003/0191769 A1 * | 10/2003 | Crisan et al. ................ 707/100 |
| 2004/0006403 A1 * | 1/2004 | Bognanno .................... 700/109 |
| 2004/0025048 A1 * | 2/2004 | Porcari et al. ............... 713/200 |
| 2004/0078105 A1 * | 4/2004 | Moon et al. ................. 700/100 |
| 2004/0143597 A1 * | 7/2004 | Benson et al. ........... 707/104.1 |
| 2005/0257045 A1 * | 11/2005 | Bushman et al. ............. 713/156 |
| 2006/0070025 A1 * | 3/2006 | Mauceri et al. ............. 717/106 |
| 2007/0061358 A1 * | 3/2007 | Brooks et al. ........... 707/103 R |

OTHER PUBLICATIONS

Karamanolis et al.; Model Checking of Workflow Schemas; 2000 IEEE; pp. 170-179.*

Georgakopoulos et al.; An Overview of Workflow Management: From Process Modeling to Workflow Automation Infrastructure; 1995 Kluwer Academic Publisher; pp. 119-153.*

Salah et al.; An Architecture for the Interoperability of Workflow Models; Nov. 4, 2005; ACM; pp. 31-37.*

USPTO office action for U.S. Appl. No. 11/109,087 dated Jan. 25, 2010.

* cited by examiner

POLICY BASED AUDITING OF WORKFLOWS

CROSS REFERENCE TO RELATED APPLICATION

This application is a continuation application of co-pending U.S. utility patent application entitled "Policy Based Auditing of Workflows" filed on Apr. 19, 2005 and accorded Ser. No. 11/109,087, and claims priority therefrom.

FIELD OF THE INVENTION

The present invention is directed to multi computer data transferring and computer network monitoring in general, and to auditing of workflows over a network in particular.

BACKGROUND OF THE INVENTION

As used herein, workflow means the organization of processes into a well-defined flow of operations to fulfill a business need. A process means a defined series of tasks to be completed in stages where data is forwarded to an appropriate member of a workgroup for each task resulting in a final workflow data. As used herein workgroup means a plurality of users, each having a computer connected to one or more other users within the group by a network, and where the plurality of users communicate through the network to accomplish a defined series of tasks to produce a final workflow product.

Workflow products need a mechanism to enforce a policy on a given workflow in order to ensure that the workflow consistently complies with a given standard or expectation. One example of this would be a workflow that violates organizational security policies by using credentials (user id/pass) to login to a target server instead of Secure Sockets Layer (SSL) certificates. Another example is the Global Solutions Directory (GSD) Universal Management Infrastructure (UMI) requirement to audit workflows based on a particular security policy or set of rules for items such as error handling and best coding practices. Other examples include validation of workflows based on execution of error handling, best coding or implementation practices.

Policy in workflow typically exists around what one can do to a resource within the workflow, but not to the workflow itself. The majority of current solutions manually inspect the workflows prior to making them available to the workflow engine for execution. There is, at present, no capability to automatically ensure policy enforcement immediately prior, during and at completion of a workflow execution.

Carlos Ribeiro and Paulo Guedes of IST/INESC Portugal, in "Verifying Workflow Processes against Organization Security Policies," disclose "a static analyzer that automatically verifies the consistency between workflow specification written in WPDL (Workflow Process Definition Language) and organization security policies . . . . " Specifically, the authors seek to show how an SPL (security language) specification can be checked against a WPDL workflow specification. (see http://www.inesc-id.pt/pt/inidadores/Ficheiros/1164.pdf). Douglas Long, Julie Baker, and Francis Fung of Odyssey Research Associates, in "A Prototype Secure Workflow Server" disclose their prototype policy editor, workflow server, and underlying Java-based implementation for workflow policies that provide "fine grained dynamic access and control." (see http://www.atc-nycorp.com/papers/LONG_ACSAC_SecureWorkflow.pdf). The IBM Tivoli Access Manager for Business Integration provides, inter alia, centralized administration of both access control and data protection services across mainframe and distributed servers. (see http://www-306.ibm.com/software/tivoli/products/access-mgr-bus-integration).

The above solutions focus on policy driven secured access to the resources within a workflow at the time of access. Moreover, these solutions focus on security, but do not address elimination of some or all manual inspection of workflows for compliance with business policies (such as, but not limited to, error handling, best coding or implementation practice policies). Moreover, these solutions cannot verify that the workflow itself is free from tampering at any given point in execution. What is needed is a system and method to process workflows of varying formats and standards for compliance with security and business policies. What is further needed is a mechanism to provide warnings during the processing of the workflow so that remedial action can be completed as a prerequisite to validation of the workflow.

SUMMARY OF THE INVENTION

The invention that meets the needs described above is an auditing system comprising a Policy Validation Mechanism Program (PVMP) that operates in conjunction with a Workflow Engine (WE), and a Policy Validation Server Program (PVSP) that operates on a Policy Validation Server (PVS) connected to the WE by a secure communication link. The PVMP converts a workflow to a workflow representation (WR) and sends the WR to the PVS. The PVSP compares the steps in the WR to a security policy identified for that WR and determines whether the WR is in compliance. In addition, the PVSP validates a checksum for the WR and logs the checksum for subsequent comparisons. The PVSP uses the checksum to determine whether a policy has changed during execution of the workflow. If the WR is not in compliance, if the checksum cannot be validated, or if a policy has changed, then a failure notification is sent to the WE. Otherwise, a success notification is sent to the WR. In an embodiment with Warning Management (WM), in the event of a failure, a warning report is sent so that if approval workflows are completed and returned, a response may be changed to success. The PVMP sends the WR to the PVS at random intervals. Upon receipt of a failure notification, the PVMP suspends the workflow until corrective action can be completed, the corrected workflow converted to a WR, and the WR sent to the PVS.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

Figure 1:
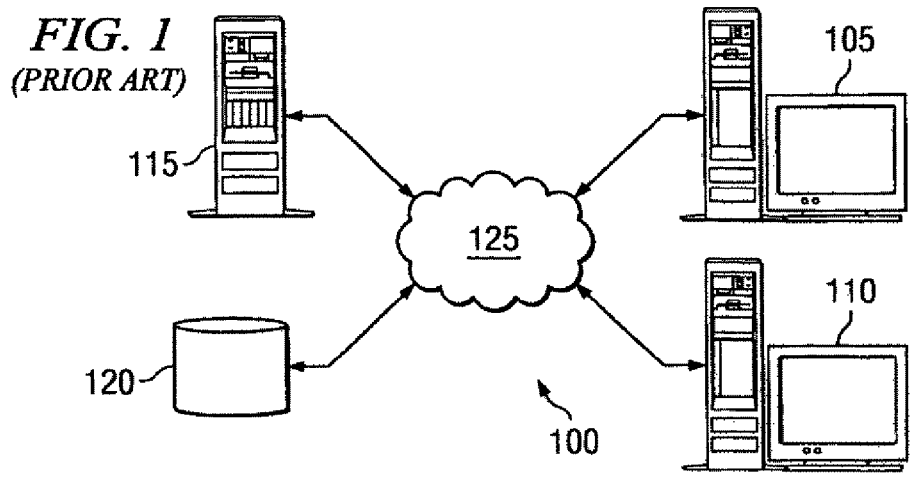
FIG. 1 is an illustration of a computer network used to implement the present invention.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a set of computer programs that configure and enable a client computer and a server computer to implement the novel aspects of the invention. For illustrative purposes, the inventive computer programs will be referred to as the Policy Validation Mechanism Program (PVMP) and the Policy Validation Server Program (PVSP).

As used herein, checksum means a calculation performed using a formula to determine a second numerical value for an electronic message where the message contains a first numerical value that was calculated using the formula before the message was sent (so that, upon receipt, if the first and second numerical values are different, the message is known to have been changed in transit). As used herein, Final Workflow Data File (FWDF) means a data file that contains the results of the completion of the defined tasks in a workflow by a workgroup. As used herein, Policy Validation Mechanism (PVM) means a program within or interacting with the Workflow Engine that sends the Workflow Representation to the Policy Validation Server. As used herein Policy Validation Server Program (PVSP) means a program residing and operating on a policy validation server that receives a workflow representation and issues a success or failure notification. As used herein, Resource means any software or hardware available to a workgroup for use in creating a final workflow data file, but does not include the Policy Validation Server Program, or any other program residing or operating on the Policy Validation Server. As used herein, Workflow Engine (WE) means the resources available to the workgroup for a particular workflow. As used herein, Workflow Representation (WR) means a particular format to which all workflows are converted prior to transmission to the Policy Validation Server (for example, if the workflow was WebSphere Process Choreographer Flow Definition Markup Language based, and if the particular format was an open standard such as Business Process Execution Language (BPEL), then the workflow would be converted to BPEL).

Additionally, the auditing system is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2A:
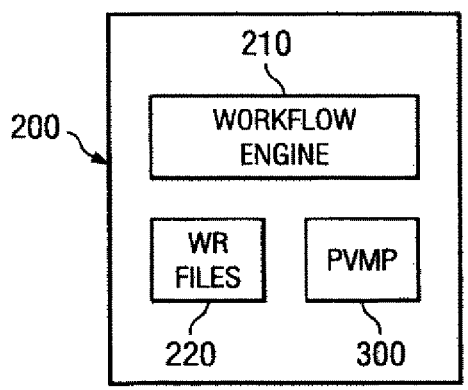
FIG. 2A is an illustration of the memory or storage of the Workflow Engine and the Policy Validation Mechanism Program (PVMP)

Policy Validation Mechanism Program (PVMP) 300 typically is stored in a memory, represented schematically as memory 200 in FIG. 2A. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2A, though, memory 200 includes additional data and programs. Of particular import to Policy Validation Mechanism Program (PVMP) 300, memory 200 includes Workflow Engine (210) and Workflow Representation files 220 with which PVMP 300 interacts.

Figure 2B:
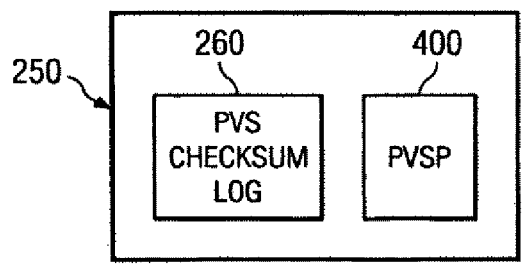
FIG. 2B is an illustration of the memory or storage of the Policy Validation Server containing the Policy Validation Server Program (PVSP)

Policy Validation Mechanism Program (PVMP) 300 typically is stored in a memory, represented schematically as memory 200 in FIG. 2A. Policy Validation Server Program (PVSP) 400 typically is stored in a memory, represented schematically as memory 250 in FIG. 2B. As depicted in FIG. 2B, memory 250 includes Policy Validation Server (PVS) and Checksum Log 260 with which PVSP 400 interacts. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2A and FIG. 2B are included merely as a descriptive expedient and do not necessarily reflect any particular physical embodiment of memory 200 and memory 250.

Figure 2C:
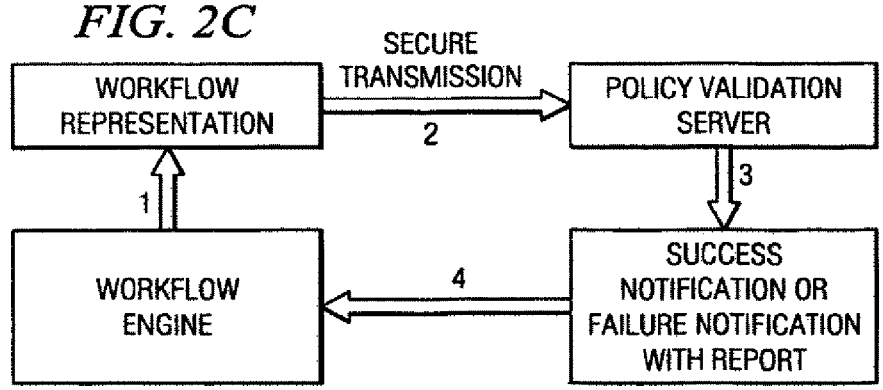
FIG. 2C is an overview of the processing of a Workflow Representation (WR)

FIG. 2C is a depiction of the overall auditing system. As will be explained in greater detail below, PVMP 300 interacts with the Workflow Engine (WE) to create a Workflow Representation (WR) (Step 1). The WR is sent by secure transmission to the Policy Validation Server (PVS) (Step 2). The PVS generates a success or failure notification and report (Step 3). The success or failure notification and report are returned to the Workflow Engine (Step 4).

Figure 3:
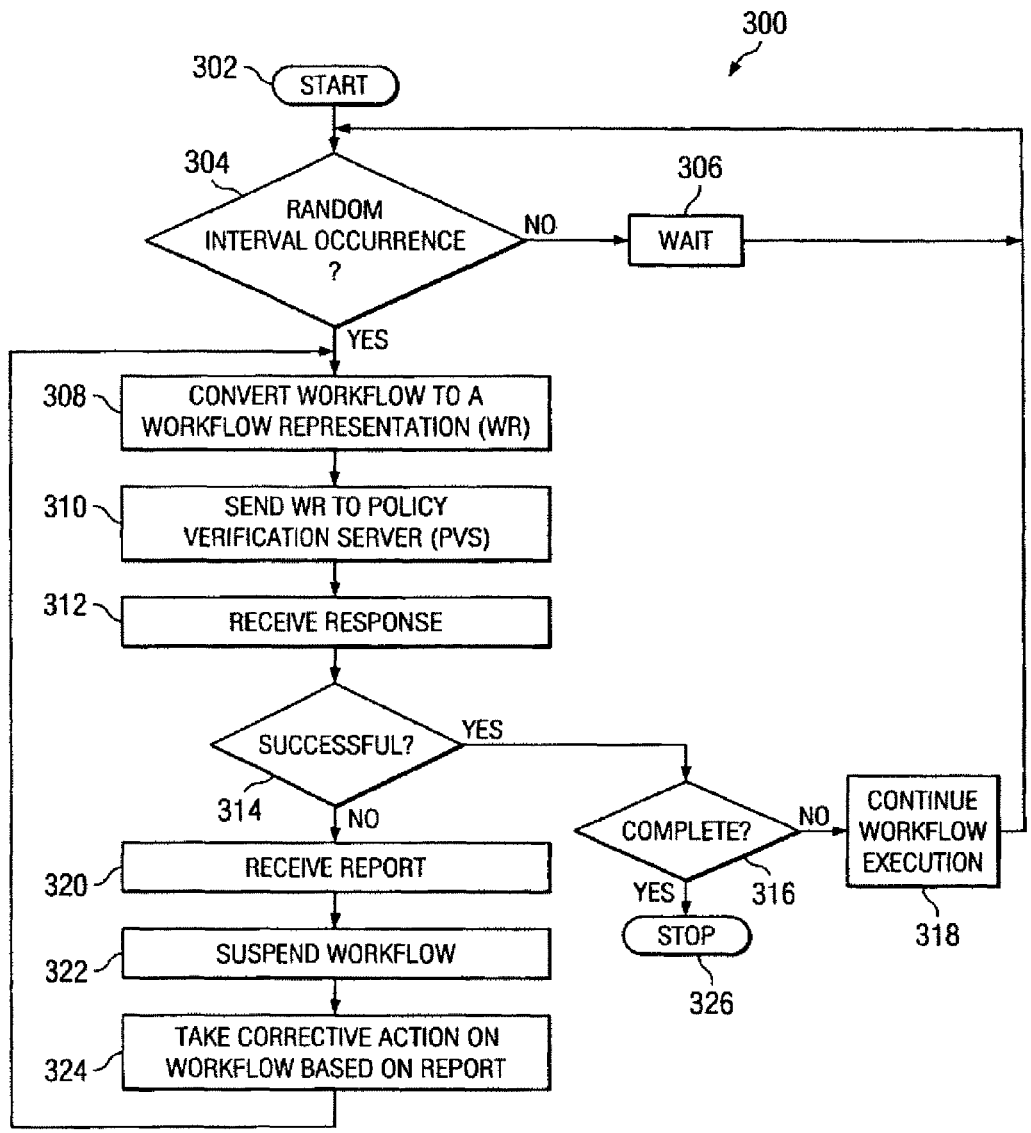
FIG. 3 is an illustration of the logic of the Policy Validation Server Process (PVSP)

FIG. 3 illustrates the logic of Policy Validation Mechanism Program (PVMP) 300. PVMP 300 starts (302) and a determination is made whether a random interval has occurred (304). (Persons skilled in the art are aware of numerous methods and devices for generating a random interval.) If not, PVMP 300 waits for the occurrence of a random interval (306). If a random interval has occurred, PVMP 300 converts the workflow to a workflow representation (WR) (308), and sends the WR to the Policy Validation Server (PVS) (310). PVMP 300 receives a response back from the PVS (312) and determines whether the WR was successfully validated (314). If the validation was not successful, PVMP 300 receives a report (320), suspends the workflow (322), takes corrective action on the Workflow based on the report (324), and returns to step 308 where the corrected workflow is converted into a new WR to be send to the PVS. If the validation was successful, a determination is made whether the workflow is completed (316). If the workflow is not completed, the workflow execution continues (318) and PVMP goes to step 304. If the workflow is completed, PVMP stops (326).

Figure 4:
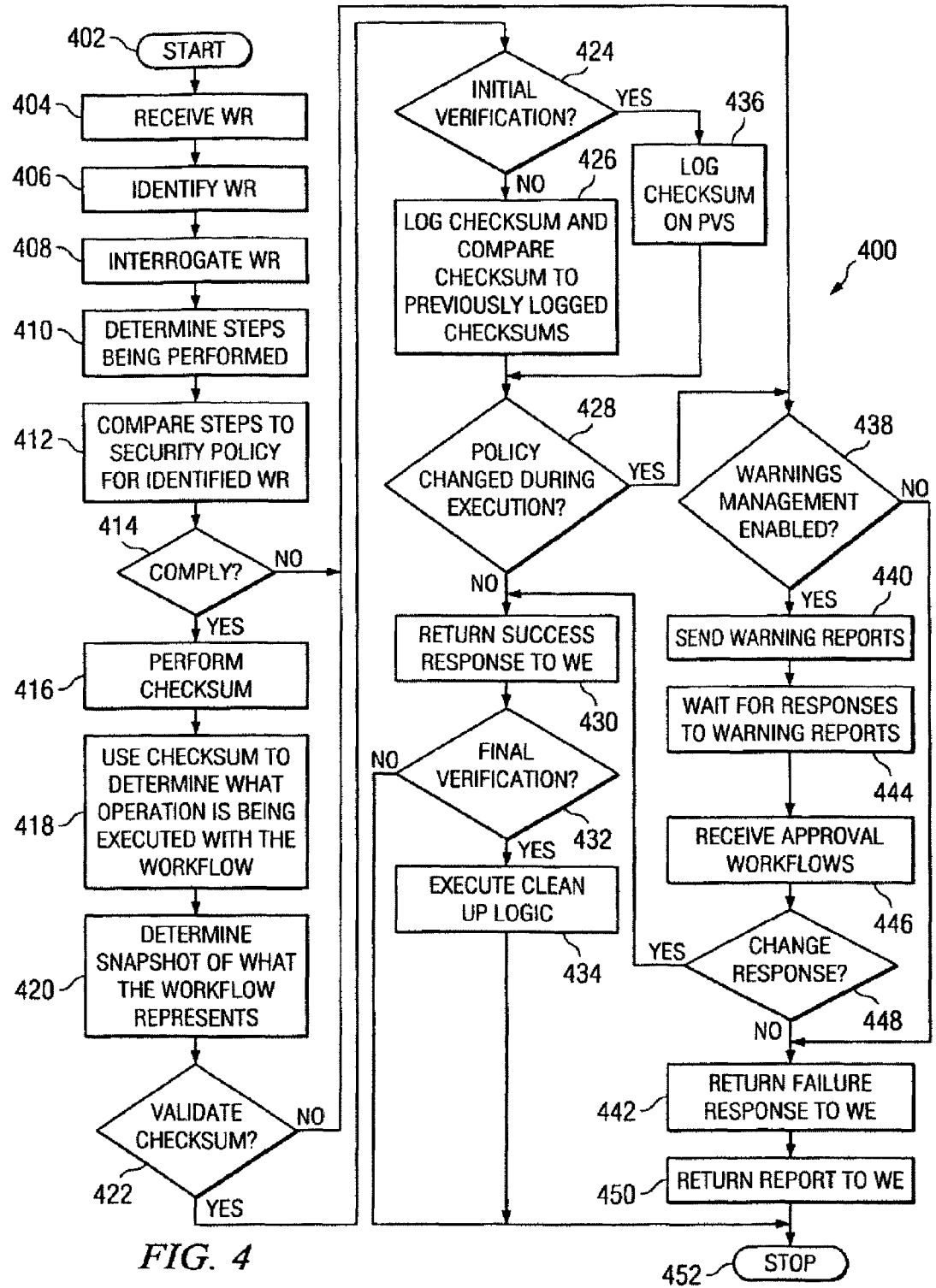
FIG. 4 is an illustration of the logic of the Policy Validation Mechanism Program (PVMP).

FIG. 4 illustrates the logic of Policy Validation Server Program (PVSP) 400. PVSP 400 starts (402) and receives a WR (404). PVSP 400 identifies the WR (406), interrogates the WR (408), and determines the steps being performed in the WR (410). PVSP 400 compares the steps in the WR to the appropriate security policy for the identified WR (412). PVSP 400 determines whether the WR complies with the security policy (414). If not, PVSP goes to step 438. If the WR complies, PVSP 400 performs a checksum on the WR (416) and uses the checksum to determine what operation is being executed with the workflow (418). PVSP 400 also uses the checksum to determine a snapshot of what the workflow represents (420). PVSP 400 then validates the checksum (422). If the checksum is validated, PVSP 400 determines whether the validation is an initial verification (424). If the validation is an initial verification, PVSP 400 logs the checksum on the PVS (436) and goes to step 428. If the validation is not an initial verification, PVSP 400 logs the checksum and compares the checksum to previously logged checksums (426). PVSP determines from the comparison of checksums, whether a policy changed during execution (428). If so, PVSP goes to step 438. If not, PVSP 400 returns a success response to the WE (430) and determines whether the verification is a final verification (432). If the verification is not final, PVSP 400 stops. If the verification is final, PVSP 400 executes cleanup logic (434) and then stops (452).

At step 438 a determination is made whether warnings management has been enabled. If so, one or more warning reports are sent (440). PVSP 400 waits for a response to the warning reports (444) and receives workflow approvals (446). Based on the workflow approvals, PVSP 400 determines whether to change its response (448). If not, PVSP 400 goes to step 442 and returns a failure response to the WE, returns a report to the WE (450), and stops (452). If PVSP 400 changes its response from failure to success, PVSP 400 goes to step 430.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. An apparatus comprising:
a workgroup connected to a workflow engine;
a server computer connected to the workflow engine by a secure transmission link;
a first program residing and operating on a client computer associated with the workflow engine; and
a second program residing and operating at the server computer;
wherein first program contains instructions to cause the client computer to asynchronously create a workflow representation from a workflow of the workgroup, and to send the workflow representation to the second program;
wherein the second program contains instructions to cause the server computer to perform a plurality of operations on the workflow representation and, wherein the plurality of operations comprises instructions to identify the workflow representation, interrogate the workflow representation, and determine a plurality of steps being performed by the workflow representation; and
wherein the second program further comprises instructions to validate a checksum, and wherein the instructions to validate the checksum further comprise instructions to perform a checksum on the workflow representation and to determine, by a processor of the policy validation server using the checksum, what operation is being executed with the workflow.

2. The apparatus of claim 1 wherein the second program further comprises instructions, responsive to a result of the operations, to send a success or failure notification to the workflow engine, and wherein the first program further comprises instructions to cause the client computer to suspend the workflow pending receipt of the success or failure notification from the second program.

3. The apparatus of claim 1 wherein the second program further comprises instructions to compare the plurality of steps to a security policy for the workflow representation and to determine compliance with the security policy.

4. The apparatus of claim 1 wherein the second program further comprises instructions to log the checksum, and to compare the checksum to a plurality of previously logged checksums.

5. The apparatus of claim 4 wherein the second program further comprises instructions to determine whether a policy changed during execution of the workflow.

6. The apparatus of claim 1 wherein the second program further comprises instructions to enable warnings management.

7. A method for auditing a workflow based on policy compliance comprising:
asynchronously creating a workflow representation from the workflow, and sending the workflow representation to a policy validation server;
performing, by a processor of the policy validation server, a plurality of operations on the workflow representation, the plurality of operations comprising: identifying the workflow representation, interrogating the workflow representation, and determining a plurality of steps being performed by the workflow representation; and
validating a checksum, wherein validating the checksum further comprises: performing a checksum on the workflow representation; and determining, by a processor of the policy validation server using the checksum, what operation is being executed with the workflow.

8. The method of claim 7 further comprising:
responsive to a result of the operations, sending a success or failure notification to a workflow engine; and
suspending the workflow pending receipt of the success or failure notification.

9. The method of claim 7 further comprising:
comparing the plurality of steps to a security policy for the workflow representation; and
determining compliance with the security policy.

10. The method of claim 7 further comprising:
logging the checksum;
comparing the checksum to a plurality of previously logged checksums to form a comparison; and
using the comparison, determining whether a policy changed during execution of the workflow.

11. A computer program product stored in a computer memory, the computer program product comprising:
instructions to a server computer to receive a workflow representation, to perform a plurality of operations on the workflow representation, wherein the plurality of operations comprise: identifying the workflow representation, interrogating the workflow representation, and determining a plurality of steps being performed by the workflow representation, to identifying a result of the operations, and responsive to the result, to send a success or failure notification to a workflow engine over a secure transmission link, to validate a checksum by performing a checksum on the workflow representation, and to determine what operation is being executed with the workflow, wherein a processor uses the checksum to determine what operation is being executed with the workflow.

12. The computer program product of claim 11 further comprising: instructions to compare the plurality of steps to a security policy for the workflow representation, and to determine compliance with the security policy.

13. The computer program product of claim 12 further comprising:
   instructions to log the checksum, to compare the checksum to a plurality of previously logged checksums to form a comparison; and using the comparison, to determine whether a policy changed during execution of the workflow.

* * * * *